United States Patent [19]

Creasy

[11] Patent Number: 5,758,480

[45] Date of Patent: Jun. 2, 1998

[54] FARMING AND GARDENING TOOLS WITH TWO SETS OF TINES

[76] Inventor: Henry V. Creasy, 615 E. Cooper, West Memphis, Ark. 72301

[21] Appl. No.: 587,638

[22] Filed: Jan. 17, 1996

[51] Int. Cl.$^6$ .................................................. A01D 7/00
[52] U.S. Cl. ........................ 56/400.04; 56/400.06; 56/400.16; 56/400.21; 172/378
[58] Field of Search ........................ 172/378, 371; 56/400.01, 400.04, 400.05, 400.06, 400.16, 400.21, DIG. 3, DIG. 18

[56] References Cited

U.S. PATENT DOCUMENTS

| | | | |
|---|---|---|---|
| 849,304 | 4/1907 | Whitted | 56/400.16 |
| 1,352,386 | 9/1920 | Rundberg | 56/400.16 X |
| 4,741,150 | 5/1988 | Saksun | 56/400.01 X |
| 5,311,733 | 5/1994 | Krenkel | 56/400.16 X |

*Primary Examiner*—Terry Lee Melius
*Assistant Examiner*—Heather Shackelford

[57] ABSTRACT

A tool comprising a tubular head having closed ends with an axially enlarge central extend and with an enlarged annular central region with a fixed abutment surface, a plurality of radially extending male threads formed in the head adjacent to the abutment surface; a threaded nut releasably positionable on the male threads of the head and providing an adjustable abutment surface with an annular bearing surface between the fixed and adjustable bearing surfaces; a plurality of rigid linear tines extending from the head on opposite sides of the abutment surfaces, the tines including long tines extending angularly from the head and with a plurality of short tines extending angularly from the head, the long tines being in a first plane and the short tines being in a second plane, the first and second planes being at an angle with respect to each other, extending at angles from the exterior surface of the head, female threads formed in the head with the tines having coupleable male threads at the interior ends of each tine adapted to be removable received in female threads in the head; and a coupling component including a receptacle with an interior cone-shaped configuration for receiving the lower end of a handle, the coupling component having a lower end with an annular aperture positionable on the bearing surface of the head.

3 Claims, 2 Drawing Sheets

5,758,480

FARMING AND GARDENING TOOLS WITH TWO SETS OF TINES

BACKGROUND OF THE INVENTION

1. Field of the Invention

The present invention relates to farming and gardening tools with two sets of tines and more particularly pertains to adjusting two sets of tines on a farming and gardening tool for selective use as a fork and a rake.

2. Description of the Prior Art

The use of forks and rakes and other farming and gardening tools is known in the prior art. More specifically, forks and rakes and other farming and gardening tools of various design and configurations heretofore devised and utilized for the purpose of extending the utility of tools with tines to various methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 3,643,410 to Menning discloses a lawn tool in the form of a pair of leaf rakes.

U.S. Pat. No. 3,601,966 to Kerry discloses a combination rake and pickup device.

U.S. Pat. No. Des. 296,510 to Cohen discloses an ornamental design for a combined rake and collector.

U.S. Pat. No. Des. 292,261 to Mitton discloses an ornamental design for a combined rake and pitchfork.

Lastly, U.S. Pat. No. 5,290,013 to Dearman discloses a spading tool with an elongated handle.

In this respect, the farming and gardening tools with two sets of tines according to the present invention substantially departs from the conventional concepts and designs of the prior art, and in doing so provides an apparatus primarily developed for the purpose of adjusting two sets of tines on a farming and gardening tool for selective use as.

Therefore, it can be appreciated that there exists a continuing need for new and improved farming and gardening tools with two sets of tines which can be used for adjusting two sets of tines on a farming and gardening tool for selective use as. In this regard, the present invention substantially fulfills this need.

SUMMARY OF THE INVENTION

In view of the foregoing disadvantages inherent in the known types of forks and rakes and other farming and gardening tools of various design and configuration now present in the prior art, the present invention provides an improved farming and gardening tools with two sets of tines. As such, the general purpose of the present invention, which will be described subsequently in greater detail, is to provide a new and improved farming and gardening tools with two sets of tines and method which has all the advantages of the prior art and none of the disadvantages.

To attain this, the present invention essentially comprises an adjustable farming and gardening tool with two sets of tines that can be adjusted for use as a fork and a rake comprising a tubular head having closed ends with an axially enlarge central extend and with an enlarged annular central region with a fixed abutment surface, a plurality of radially extending male threads formed in the head adjacent to the abutment surface; a threaded nut releasably positionable on the male threads of the head and providing an adjustable abutment surface with an annular bearing surface between the fixed and adjustable bearing surfaces.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved farming and gardening tools with two sets of tines which have all the advantages of the prior art forks and rakes and other farming and gardening tools of various design and configuration and none of the disadvantages.

It is another object of the present invention to provide new and a improved farming and gardening tools with two sets of tines which may be easily and efficiently manufactured and marketed.

It is further object of the present invention to provide a new and improved farming and gardening tools with two sets of tines which are of durable and reliable constructions.

An even further object of the present invention is to provide a new and improved farming and gardening tools with two sets of tines which are susceptible of a low cost of manufacture with regard to both materials and labor, and which accordingly are then susceptible of low prices of sale to the consuming public, thereby making such farming and gardening tools with two sets of tines economically available to the buying public.

Still yet another object of the present invention is to provide a new and improved farming and gardening tools with two sets of tines which provide in the apparatuses and methods of the prior art some of the advantages thereof, while simultaneously overcoming some of the disadvantages normally associated therewith.

Even still another object of the present invention is to adjusting two sets of tines on a farming and gardening tool for selective use as.

Lastly, it is an object of the present invention to provide a new and improved adjustable tool with two sets of tines comprising a tubular head having closed ends with an axially enlarge central extend and with an enlarged annular central region with a fixed abutment surface, a plurality of radially extending male threads formed in the head adjacent to the abutment surface; a threaded nut releasably positionable on the male threads of the head and providing an adjustable abutment surface with an annular bearing surface between the fixed and adjustable bearing surfaces; a plurality of rigid linear tines extending from the head on opposite sides of the abutment surfaces, the tines including long tines extending angularly from the head and with a plurality of short tines extending angularly from the head, the long tines being in a first plane and the short tines being in a second plane, the first and second planes being at an angle with respect to each other, extending at angles from the exterior surface of the head, female threads formed in the head with the tines having coupleable male threads at the interior ends of each tine adapted to be removable received in female threads in the head; and a coupling component including a receptacle with an interior cone-shaped configuration for receiving the lower end of a handle, the coupling component having a lower end with an annular aperture positionable on the bearing surface of the head with the axial extents of the lower end being secured a pre-selected rotational orientation by the adjacent abutment surfaces.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figures 1, 2:
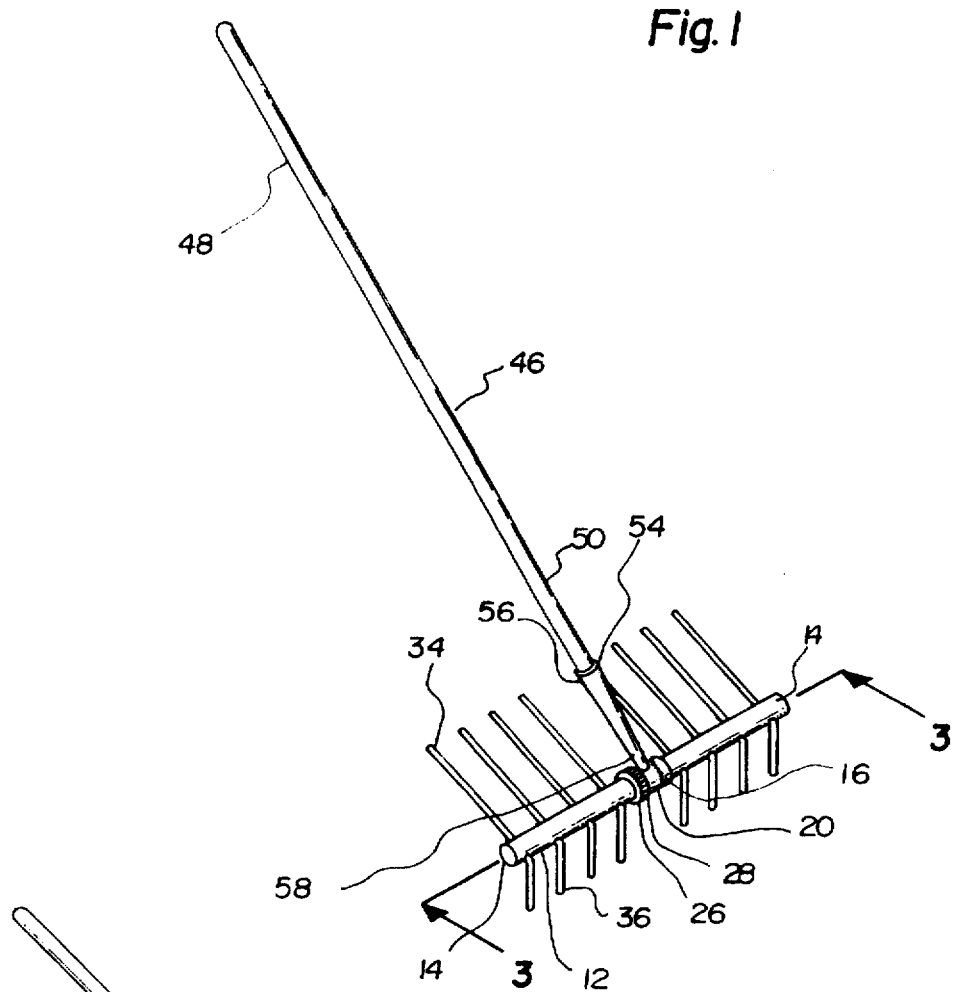
FIG. 1 is a perspective illustration of the preferred embodiment of the known and improved farming and gardening tools with two sets of tines constructed in accordance with the principles of the present invention.
FIG. 2 is a side elevational view of the devise shown in FIG. 1.

With reference now to the drawings, and in particular to FIG. 1 thereof, the preferred embodiment of the new and improved farming and gardening tools with two sets of tines embodying the principles and concepts of the present invention and generally designated by the reference numeral 10 will be described.

The present invention, the new and improved farming and gardening tools with two sets of tines is comprised of a plurality of components. Such components in their broadest context include rake, fork, short tines, long tines, nut, handle, and receptacle. Such components are individually configured and correlated with respect to each other so as to attain the desired objective.

Figure 3:
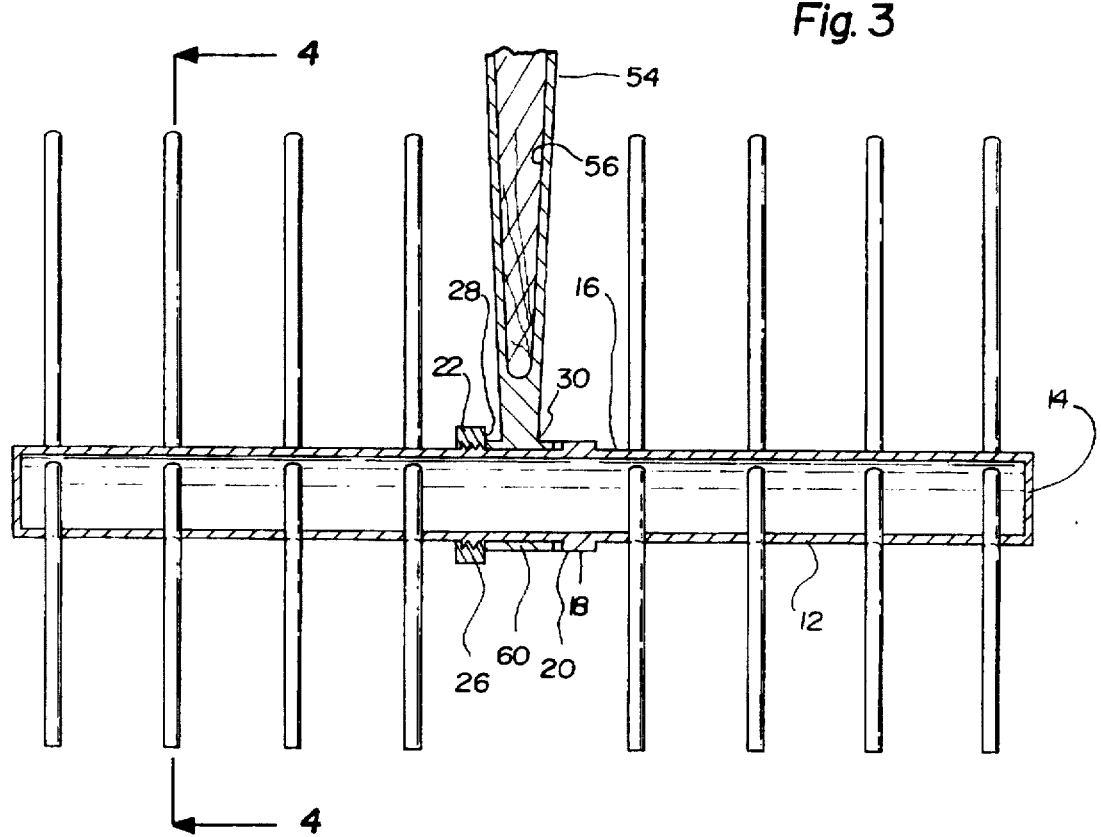
FIG. 3 is a cross-sectional view taken along line 33 of FIG. 1.
Figure 4:
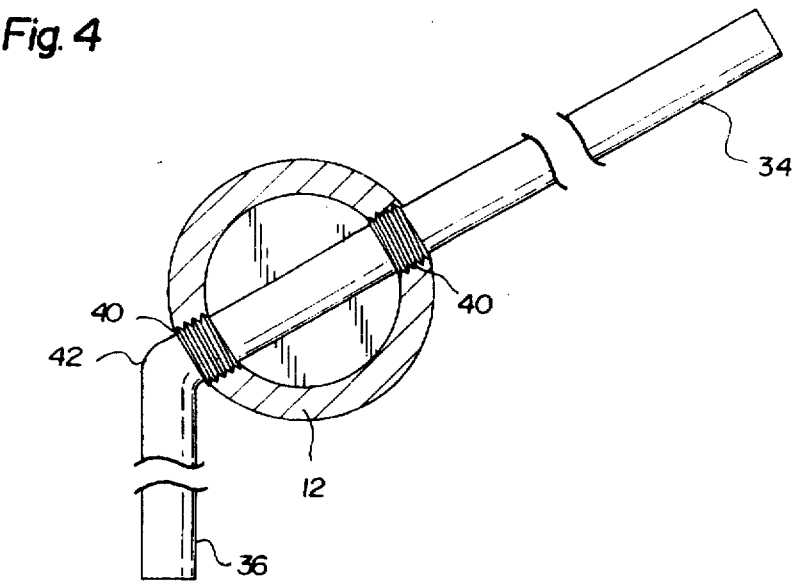
FIG. 4 is a cross-sectional view taken along line 44 of FIG. 3.

The present invention may be construed as a system 10. Such system has as a central component, a tubular head 12. The head has closed ends 14 in an axially elongated central extent 16. The central extent is formed with a radially enlarged central region 18 extending from the outer peripheral surface with a fixed abutment surface 20 formed thereon. Since the central region is radially enlarged, the abutment surface is radial, as shown in FIG. 3. In addition, a plurality of radially extending male threads 22 are formed in the head adjacent to the abutment surface.

Also provided in association with the head is a threaded nut 26. The threaded nut is releasably and adjustable positionable on the male threads of the head. The nut provides an adjustable abutment surface 28. In addition, an annular bearing surface 30 is thus formed on the head between the fixed and adjustable bearing surfaces.

Formed with respect to the head and separatably coupleable with respect thereto are a plurality of rigid linear tines. The tines extend from the head on opposite sides of the abutment surfaces. The tines include long tines 34. Such long tines are adapted for use as a rake. They extend angularly from the head. In addition, a plurality of short tines 36 are also provided to extend angularly from the head. The long tines are located in a first plane and the short tines are located in a second plane. The first and second planes are at an angle of between about 95 degrees and 130 degrees with respect to each other. Such tines extend at angles from the exterior surface of the head.

The head is also formed with diametrically opposed female threads 40 formed in the head. In addition, the tines have cooperable male threads. Such male threads are adapted to be removably received in the female threads in the head. The short tines are preferably formed at an angle to create a bend 42 adjacent to their threads.

In association with the tubular head, there is provided an elongated handle 46. Such handle has an upper end 48 for being held by a user. The handle also has a lower end 50 for being coupled with respect to the head.

Lastly provided as part of the system 10 is a coupling component 54. The coupling component includes a receptacle 56 with an interior cone-shaped configuration. Such receptacle is for receiving the lower end of the handle. The coupling component also has a lower end 58. The lower end is formed with an annular aperture 60. Such annular aperture is positionable on the bearing surface of the head. The axial extents of the lower end are adapted to be secured in a pre-selected rotational orientation and held there by the adjacent abutment surfaces. In this manner, loosening of the nut will allow for varying the angular orientation between the handle and the tines.

The present invention is an adjustable farming/gardening tool with two series of tines. The tool can be adjusted for use as either a fork or rake. The present invention consists of a tool that has two sets of steel tines and a long wooden handle similar to that found on a rake or shovel. In the center at the base of the tines is an adjusting mechanism consisting of a grip-lock nut that secures a slidable steel cylinder on a threaded steel shaft. The device can be sued as a fork for grabbing roots or as a traditional rake. With this tool, a person can easily alternate between rake and fork modes. Anyone who does farming or gardening would benefit from having this novel product.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved adjustable farming and gardening tool with two sets of tines that can be adjusted for use as a fork and a rake comprising, in combination:

a tubular head having closed ends with an axially elongated central extent and with an enlarged annular central region with a radial fixed abutment surface formed on an outer surface of the tubular head, a plurality of radially extending male threads formed in the head adjacent to the abutment surface;

a threaded nut releasably positionable on the male threads of the head and providing an adjustable abutment surface with an annular bearing surface between the fixed and adjustable abutment surfaces, wherein the adjustability of the adjustable abutment surface is afforded via the threads;

a plurality of rigid linear tines extending from the head on opposite sides of the abutment surfaces, the tines including long tines adaptable for use as a rake extending angularly from the head and a plurality of short tines extending angularly from the head, the long tines being in a first plane and the short tines being in a second plane, the first and second planes being at an angle of between 95 and 130 degrees with respect to each other, extending at angles from the exterior surface of the head, diametrically opposed female threads formed in the head with the tines having coupleable male threads on each tine adapted to be removably received in the female threads in the head, the short tines being bent adjacent to their threads;

an elongated handle having an upper end for being held by a user and a lower end being coupled with respect to the head; and a coupling component including a receptacle with an interior cone-shaped configuration for receiving the lower end of the handle, the coupling component having a lower end with an annular aperture positionable on the annular bearing surface of the head with the lower end of the handle being secured a pre-selected rotational orientation by the fixed and adjustable abutment surfaces whereby loosening of the nut will allow for varying the angular orientation between the handle and the tines.

2. An adjustable tool with two sets of tines comprising:

a tubular head having closed ends with an axially elongated central extent and with an enlarged annular central region with a radial fixed abutment surface formed on an outer surface of the tubular head, a plurality of radially extending male threads formed in the head adjacent to the abutment surface;

a threaded nut releasably positionable on the male threads of the head and providing an adjustable abutment surface with an annular bearing surface between the fixed and adjustable abutment surfaces, wherein the adjustability of the adjustable abutment surface is afforded via the threads;

a plurality of rigid linear tines extending from the head on opposite sides of the abutment surfaces, the tines including long tines extending angularly from the head and a plurality of short tines extending angularly from the head, the long tines being in a first plane and the short tines being in a second plane, the first and second planes being at an angle with respect to each other, extending at angles from the exterior surface of the head, female threads formed in the head with the tines having coupleable male threads on each tine adapted to be removably received in the female threads in the head; and a coupling component including a receptacle with an interior cone-shaped configuration for receiving the lower end of a handle, the coupling component having a lower end with an annular aperture positionable on the annular bearing surface of thee head with the lower end of the handle being secured a pre-selected rotational orientation by the the fixed and adjustable abutment surfaces.

3. An adjustable tool with two sets of tines comprising:

a tubular head having closed ends with an axially elongated central extent and with an enlarged annular central region with a radial fixed abutment surface formed on an outer surface of the tubular head, a plurality of radially extending male threads formed in the head adjacent to the abutment surface;

a threaded nut releasably positionable on the male threads of the head and providing an adjustable abutment surface with an annular bearing surface between the fixed and adjustable abutment surfaces, wherein the adjustability of the adjustable abutment surface afforded via the threads;

a plurality of rigid linear tines extending from the head on opposite sides of the abutment surfaces, the tines including long tines extending angularly from the head and a plurality of short tines extending angularly from the head, the long tines being in a first plane and the short tines being in a second plane, the first and second planes being at an angle with respect to each other, extending at angles from the exterior surface of the head, female threads formed in the head with the tines having coupleable male threads on each tine adapted to be removably received in the female threads in the head; and a coupling component including a receptacle with an interior cone-shaped configuration for receiving the lower end of a handle, the coupling component having a lower end with an annular aperture positionable on the annular bearing surface of the head with the lower end of the handle being secured a pre-selected rotational orientation by the fixed and adjustable abutment surfaces; and an elongated handle having an upper end for being held by a user and a lower end being coupled with respect to the head.

* * * * *